(12) United States Patent
Packard

(10) Patent No.: US 6,811,301 B2
(45) Date of Patent: Nov. 2, 2004

(54) FEEDER CONTROL SYSTEM FOR AN AUTOMATED BLENDER SYSTEM

(75) Inventor: Keith Packard, Dayton, OH (US)

(73) Assignee: HydReclaim, Inc., Wood Dale, IL (US)

( * ) Notice: Subject to any disclaimer, the term of this patent is extended or adjusted under 35 U.S.C. 154(b) by 59 days.

(21) Appl. No.: 10/109,008

(22) Filed: Mar. 29, 2002

(65) Prior Publication Data

US 2003/0185094 A1 Oct. 2, 2003

(51) Int. Cl.$^7$ ................................................. B01F 15/02
(52) U.S. Cl. ....................................... 366/141; 700/240
(58) Field of Search ............................ 366/16–19, 141, 366/151.1, 183.1; 222/56–58; 700/240, 241, 305

(56) References Cited

U.S. PATENT DOCUMENTS

| | | |
|---|---|---|
| 3,329,313 A | 7/1967 | Mayer |
| 3,498,395 A | 3/1970 | Henry |
| 3,643,752 A | 2/1972 | Blodgett |
| 3,724,569 A | 4/1973 | Blodgett |
| 3,828,869 A | 8/1974 | Sellers |
| 3,944,004 A | 3/1976 | Lafitte et al. |
| 3,985,266 A | 10/1976 | Wright, Jr. |
| 3,997,769 A | 12/1976 | Hansmann |
| 4,100,984 A | 7/1978 | Klopfenstein et al. |
| 4,157,032 A | 6/1979 | Schaberg |
| 4,301,510 A * | 11/1981 | Ricciardi et al. ............. 222/58 |
| 4,366,872 A | 1/1983 | Brunnschweiler et al. |
| 4,370,779 A | 2/1983 | Meier |
| 4,476,534 A | 10/1984 | Schlosser |
| 4,508,186 A | 4/1985 | Sashiki et al. |
| 4,552,235 A | 11/1985 | Brunnschweiler |
| RE32,101 E | 4/1986 | Ricciardi et al. |
| RE32,102 E | 4/1986 | Ricciardi et al. |
| 4,580,689 A | 4/1986 | Slater |
| 4,581,704 A * | 4/1986 | Mitsukawa .................. 700/240 |
| 4,610,323 A | 9/1986 | Chenoweth et al. |
| 4,619,336 A | 10/1986 | Boyer et al. |
| 4,627,012 A | 12/1986 | Yamada |
| 4,642,788 A | 2/1987 | Haze |
| 4,709,914 A | 12/1987 | Taylor |
| 4,762,252 A | 8/1988 | Hyer et al. |
| 4,793,512 A | 12/1988 | Krauss |
| 4,830,508 A | 5/1989 | Higuchi et al. |
| 4,878,552 A | 11/1989 | Gebo et al. |
| 4,880,142 A | 11/1989 | Higuchi et al. |
| 4,938,385 A | 7/1990 | Hayashi |
| 4,954,975 A | 9/1990 | Kalata |
| 4,976,377 A | 12/1990 | Higuchi et al. |
| 5,103,401 A | 4/1992 | Johnson |
| 5,148,841 A | 9/1992 | Graffin |
| 5,152,354 A | 10/1992 | Hauptkorn |
| 5,184,754 A | 2/1993 | Hansen |
| 5,219,224 A * | 6/1993 | Pratt ........................... 366/141 |
| 5,240,324 A * | 8/1993 | Phillips et al. ............... 366/141 |

(List continued on next page.)

FOREIGN PATENT DOCUMENTS

| | | |
|---|---|---|
| JP | 54-3766 | 1/1979 |
| JP | 63-159722 | 7/1988 |
| JP | 03-249523 | 11/1991 |
| JP | 09-327439 | 12/1996 |

Primary Examiner—Charles E. Cooley
(74) Attorney, Agent, or Firm—Dickstein Shapiro Morin & Oshinsky LLP (57) ABSTRACT

An improved feeder control system is disclosed. The system implements an incremental metering process that incorporates the standard deviation of the material feeder. By intentionally initially under metering at a level corresponding the standard deviation of the feeder, and then subsequently metering a more accurate delivery of materials is achieved. Additionally, the system implements a system for correcting for metering errors caused by gate cycles delays. By incorporating offsets into a feed time when gate cycle time is larger than the feed time, error caused by significant gate cycle times is cured.

7 Claims, 7 Drawing Sheets

U.S. PATENT DOCUMENTS

| | | |
|---|---|---|
| 5,260,880 A | 11/1993 | Tump |
| 5,341,307 A | 8/1994 | Myhre et al. |
| 5,567,918 A | 10/1996 | Bachmann et al. |
| 5,719,355 A | 2/1998 | Nishimura |
| 5,853,244 A * | 12/1998 | Hoff et al. .................... 222/58 |
| 5,859,389 A | 1/1999 | Tatsuoka et al. |
| 5,869,788 A | 2/1999 | Gordon et al. |
| 5,975,747 A | 11/1999 | Flaherty |
| 6,007,236 A * | 12/1999 | Maguire .................... 366/141 |
| 6,057,515 A | 5/2000 | Murai et al. |
| 6,173,214 B1 | 1/2001 | Neelay et al. |
| 6,173,864 B1 | 1/2001 | Reighard et al. |
| 6,194,670 B1 | 2/2001 | Reichmuth et al. |
| 6,213,174 B1 | 4/2001 | Cook et al. |
| 6,331,927 B1 | 12/2001 | Overgaard |
| 2001/0020647 A1 | 9/2001 | Hansen |

* cited by examiner

FEEDER CONTROL SYSTEM FOR AN AUTOMATED BLENDER SYSTEM

BACKGROUND

This invention relates to a method and apparatus for more accurately measuring and blending particulate material.

In the past, slide gate feeders were not very accurate at dispensing small amounts of material. The use of auger feeders was required in order to dispense small amounts with any accuracy. This was primarily due to the mechanical standard deviation of the slide gate. If a slide gate is repeatedly opened for a precise amount of time the amount of material that is dispensed through the gate varies. This variation is related to the amount of time that the gate is open. If a gate opens for a small amount of time (in milliseconds) a smaller error occurs than if the gate opens for a large amount of time (in seconds). This error is caused by the way that material flows through the hopper. Opening the gate for small amounts of time doesn't give the material in the hopper a chance to move. Instead it slices the material present at the gate. When the gate opens for large amounts of time the material flows down the hopper. This flow is not perfect in any hopper due to the shape of the material and/or the fact that the material tends to surge in pulses. If a gate opens for several seconds, the material surges several times; sometimes it will surge three times, while other times it will surge two or four times. This variation causes significant error during metering. Typically, a control algorithm will keep metering until the appropriate target weight is reached; but this results in overshooting the target and therefore providing surplus material. The key is to prevent overshooting caused by this deviation. To compensate for those surges and overfills, some systems employ augers. An auger is unaffected by the material surging in the hopper because the material, in the auger system, is dispensed at the end away from the material surging from the hopper. Therefore, auger systems were the preferred method of metering small amounts. The problem with auger systems is that they have to be sized correctly. If an auger is too big for the material, then the resulting standard deviation will also be enormous and cause overshooting the target weight.

Additionally, when metering uses a gate feeder, the gate feeder's cycle time (the time to open and close the gate) may prevent any material from being dispensed. When metering small amounts, the feed time is small and may be smaller than the cycle time. If the feed time is smaller than the cycle time, then no material will be dispensed. Consequently, if a control system designates a feed time for a gate feeder smaller than the cycle time, then the control system will mistakenly believe that material is being dispensed.

Since gate feeders do not have to be sized to correspond to different materials, it would be desirable to use gate feeders to feed material.

It is an object of the invention to provide a method and apparatus for accurately metering flowable, bulk solid material using a slide gate feeder that solves to an extent the above noted pitfalls by incorporating the standard deviation of a feeder into the metering process. In another aspect the invention incorporates consideration of a feeder's cycle time into the metering process.

In another aspect, a blending system for proportionately combining materials method includes metering a feed material including the steps of: designating a recipe and a batch size, calculating target weight amounts of each ingredient material, calculating a corresponding feed time for each material feeder, and metering each feeder. The feed time is calculating using the feeder's material flow rate, an initial target percentage of the target weight, which corresponds to an offset for the standard deviation of the feeder, and compensating for the feeder's gate cycle time.

DETAILED DESCRIPTION OF THE PREFERRED EMBODIMENTS

A first aspect of the present invention is to increase the accuracy of fed material through a slide gate. A slide gate's mechanical deviation causes inaccurate measurements of fed flowable, bulk solid materials, e.g., pelletized plastic resins, and causes overshooting target amounts of material. In this aspect of the present invention, the slide gate's mechanical standard deviation is measured and adjusted for in the feed-control algorithm. This adjustment prevents overshooting caused by this deviation.

Typically, a control algorithm will keep metering until the appropriate target weight is reached; but this results in overshooting the target and therefore providing surplus material. The control algorithm of the present invention instead meters to a percentage of the target weight based on the standard deviation of the gate and entered as a parameter in the control system. Based on the Gaussian distribution principal, thirty percent (30%) of the time the actual meter will be approximately equal to the target, thirty-five percent (35%) of the time it will be high, and thirty-five percent (35%) of the time it will be low. Basically thirty-five percent (35%) of the time the first meter will be within the acceptable final desired target, sixty-five percent (65%) of the time the meter will come up short of the final desired target and have to remeter, or retry. The main difference is that when the blender retries to finish the meter it only has to dispense a small amount. Therefore, the feed time is smaller (milliseconds) and will produce a much smaller standard deviation on the retry. This generates a higher accuracy without overshooting the target. The sacrifice is that the remetering process takes more time (because of retries) than the metering process of the traditional algorithm. (Additionally, a blending system may be designed to mechanically offset this additional time by the ability to make larger batch sizes.) The result is a blender system substantially capable of metering small amounts of material from any feeder. This result substantially eliminates having to size augers or to adjust gate stops as in the past. During proper operation, it is normal for each supply hopper to retry one or two times. The control algorithm is flexible and can be adjusted to accommodate various feed mechanisms and the value for a percentage of the initial target weight (corresponding to the calculated standard deviation) is adjustable.

Another aspect of the present invention incorporates a feeder's gate cycle time in the control of an accurate feeder control system. A feeder's, therefore a blender's, accuracy is dependant on accommodating for the gate cycle time in the control of the feeder. Gate cycle time is measured at the factory and is design, not blender, dependant. Typical gate cycle times are fifty to one hundred (50–100) msecs. depending on the cylinder design. When the gate opens for a large amount of time the gate cycle time is negligible; but when metering small amounts the gate's cycle time dramatically effects the results. When calculating the feed time for each meter, the blender control system offsets the feed time by the gate cycle time. Another embodiment of the present invention adjusts for gate cycle time by temporarily increasing the feed time. As indicated above, if the gate cycle time is short then this can impact the amount of material fed (i.e., frequently less than the feed time). If, after a number of retries, the target weight has still not been attained, then the gate cycle time is temporarily doubled and then used to offset the feed time to allow the gate to remain open longer.

The blender system performs the following steps during a normal batch process:

Calculate target weight amounts based on the Recipe and the current Recipe Format Options Empty weigh hopper Calculate the feed time for the first feeder (adjusting for standard deviation of meter and adjusting for gate cycle time)

Meter the first feeder

Determine if the feeder needs to add more material to reach desired target weight and, if so, re-calculate feed time based on remaining amount and retry. Repeat until material reaches desired target weight.

Repeat until all ingredients have been added.

Figure 1:
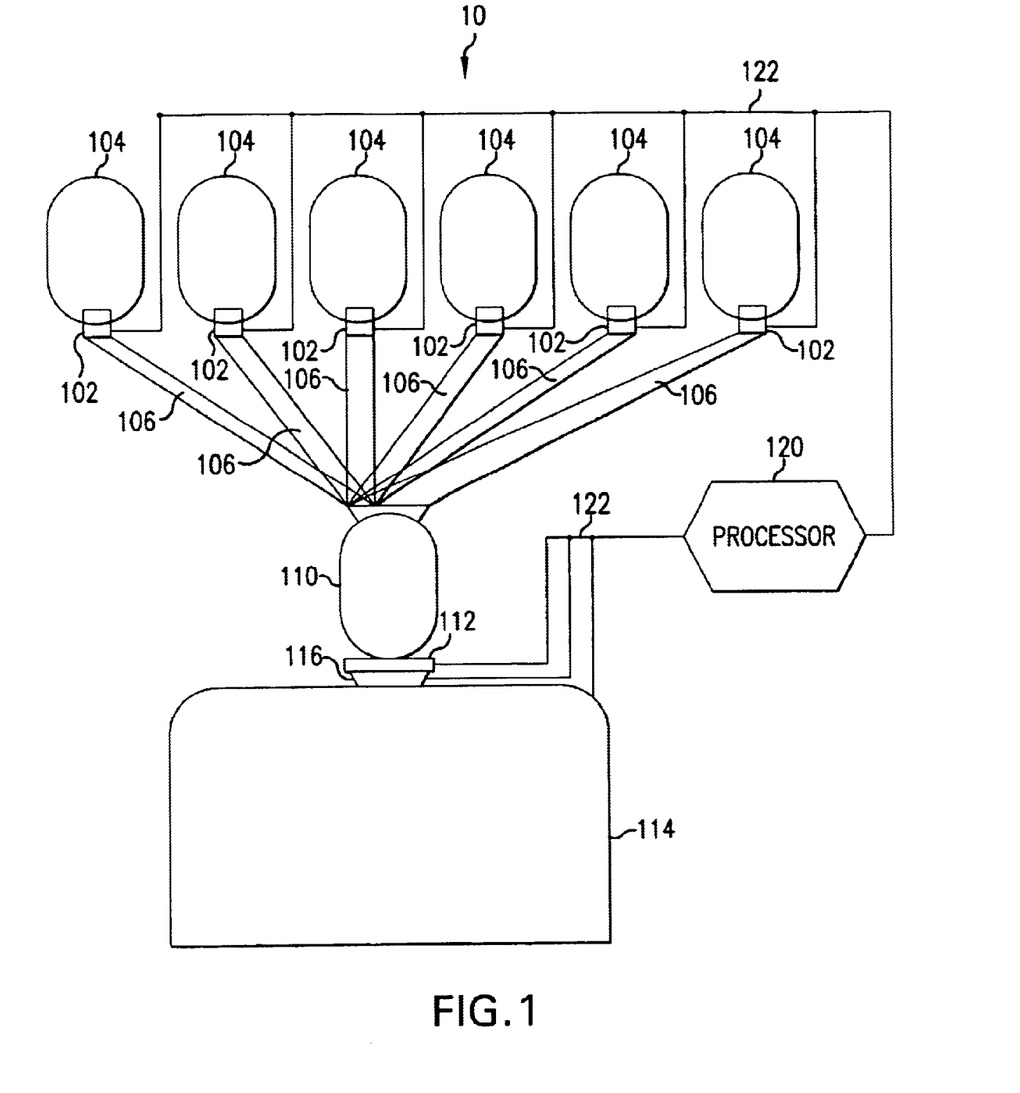
FIG. 1 is a schematic illustration of a blender control system according to a preferred embodiment of the present invention.
Figure 6:
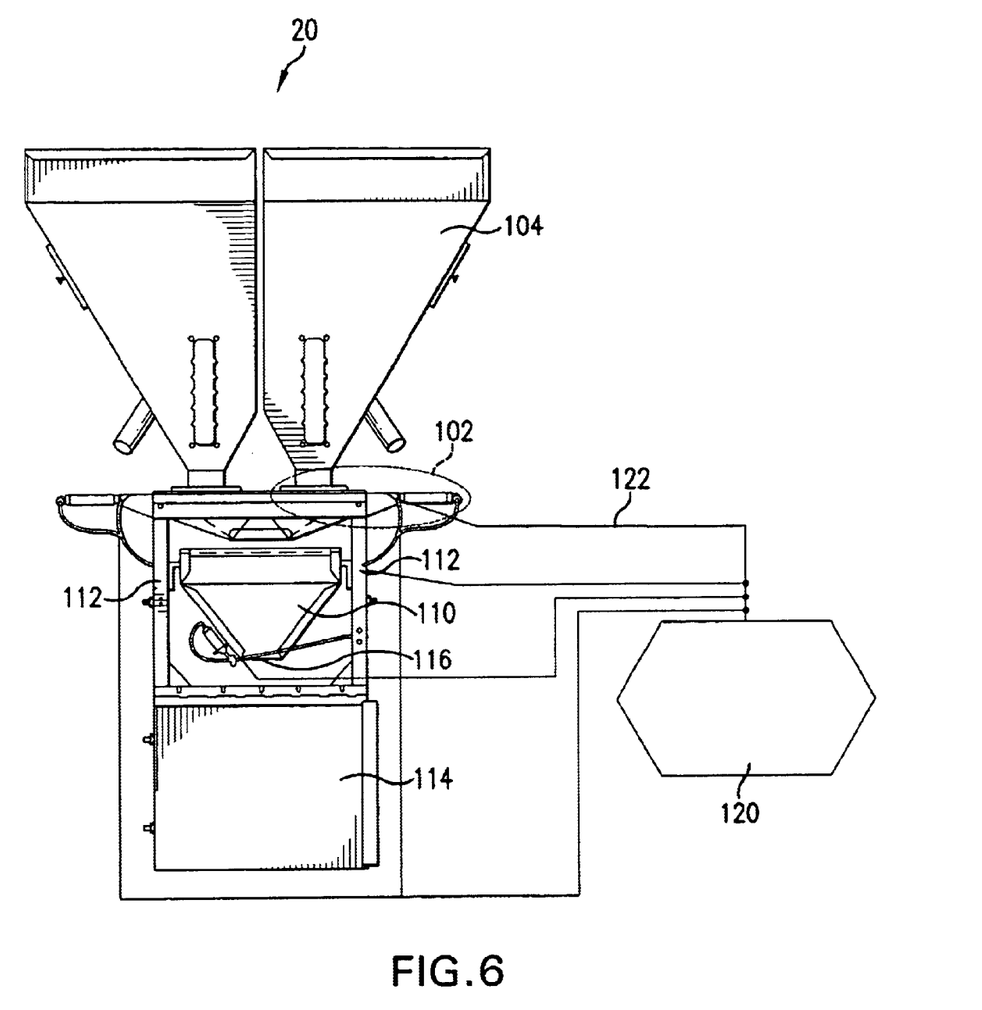
FIG. 6 is an illustration of a blender control system according to a preferred embodiment of the present invention.

FIG. 1 and FIG. 6 illustrate blender control systems 10 and 20 that can be used as embodiments of the present invention. In the figures, a supply hopper 104 stores the ingredients to be weighed. A slide gate 102, the feeder, acts as a flow regulator that controls the speed of flow of the material and is positioned at the outlet of the supply hopper 104. The slide gate 102 is able to vary the amount of ingredient supplied by varying the time that it is open. In an embodiment of the invention shown in FIG. 1, a feed tube 106 acts a delivery mechanism where one end is positioned at the outlet of the slide gate 102. In another embodiment as shown in FIG. 6, material is gravity fed and therefore may not require a feed tube 106. A weigh hopper 110 acts as a receiving vessel from the other end of the feed tube 106 and has a weighing capability and is positioned on top of a load cell 112. A dump gate 116, a flapper, acts a flow regulator and is positioned in between the outlet of the weigh hopper 110 and the inlet of the mixing chamber 114 which acts as receiving vessel for ingredients in a batch. A computer system 120 (described below) is connected to slide gate 102 and dump gate 116 via control lines 122 and controls their opening and closing. The computer system 120 is also connected through other control lines 122 to and receives weight information from the weigh hopper 110 and load cell 112.

When a batch of a recipe is made, an ingredient is delivered from the supply hopper 104 to the weigh hopper 110. The computer system 120 controls the amount of material delivered to the weigh hopper 110 by controlling the slide gate 102. The computer system 120 monitors the weight of the weigh hopper 110 and when the desired, or target, amount of material is fed, the computer system 120 opens the dump gate 116 and delivers the material into the mixing chamber 114. This process of feeding an ingredient is repeated for each ingredient remaining in the recipe. Once the recipe batch is complete, the material in the storage tank is ready for delivery down stream and another batch of this, or another, recipe can be made.

In a preferred embodiment, the supply hopper 104 is and should be of a scale appropriate for production.

In a preferred embodiment, the feeder, or feed delivery control system, 102 is a pneumatic slide gate. Other embodiments may include other slide gates or other feeder systems, such as an auger or screw mechanism.

In a preferred embodiment, material is gravity fed and the weigh hopper is disposed under the output of supply hopper so that the weigh hopper receives gravity fed material from different supply hoppers. In an alternative embodiment, the feed delivery system 106 is a feeding tube or a screw mechanism.

In a preferred embodiment, the weigh hopper 110 is a standard weigh hopper. The capacity of the container should be of a scale appropriate for production.

In a preferred embodiment, the load cell 112 is a strain gauge load cell.

In a preferred embodiment, the second feed delivery system 116, that delivers material from the weigh hopper to the mixing chamber, is a dump gate. Many other techniques are common known in the art to satisfy these requirements.

In a preferred embodiment, the mixing chamber 114 is standard mixing chamber with a capacity of scale appropriate for production.

Figure 2:
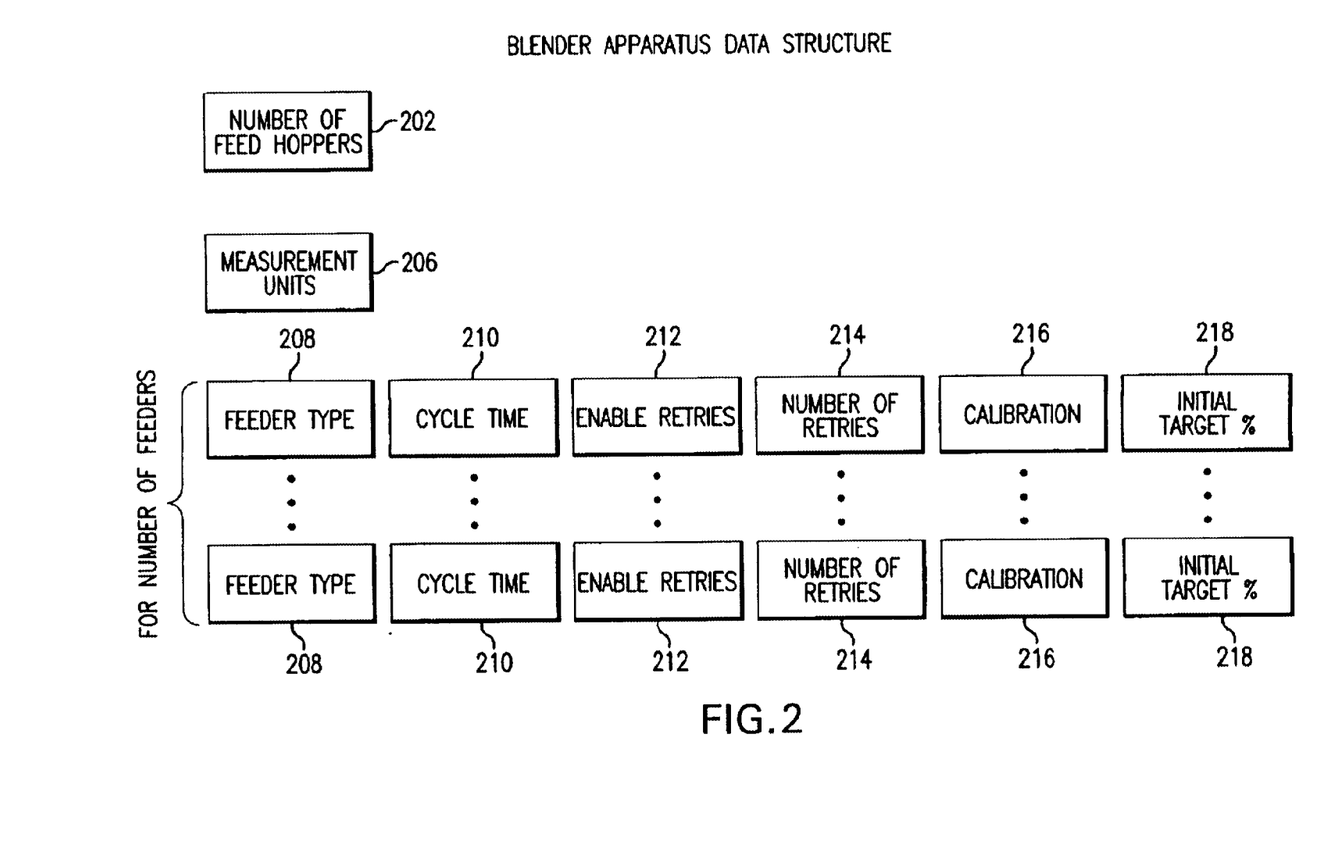
FIG. 2 is a representation of the blender apparatus data structure of a blender control system of FIGS. 1 and 6.
Figure 3:
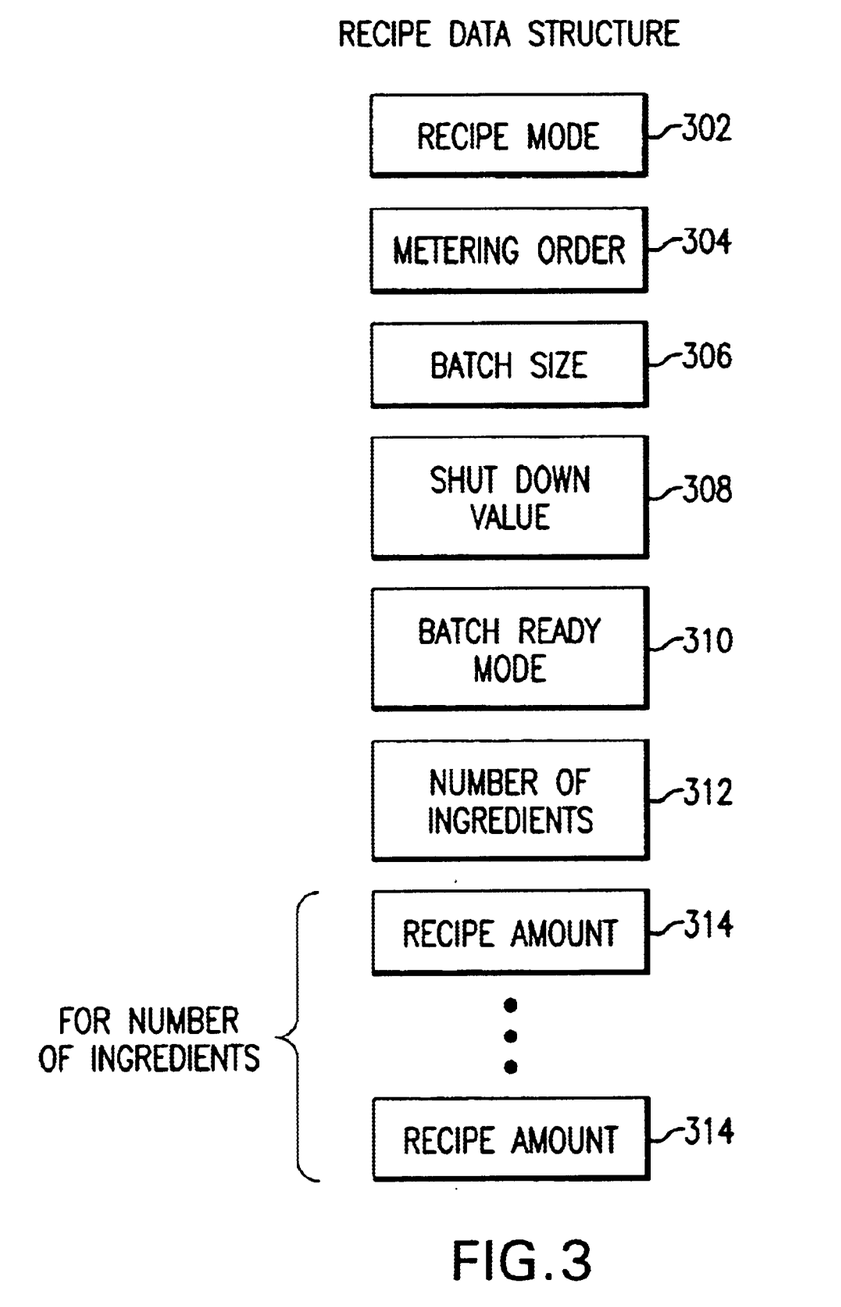
FIG. 3 is a representation of the recipe data structure of a blender control system of FIGS. 1 and 6.

In a preferred embodiment, the computer system 120, which includes both software and hardware, is an Allen Bradley Micrologix Control system. Other embodiments may include other computer systems, where the blender control system may be incorporated into either the hardware or software systems. For example, the computer system maybe implemented in a person computer, industrial computer, networked system, computer server, distributed logic system, a remote access computer, local area network (LAN), wide area network (WAN), or a programmable logic circuit (PLC). This computerized control system 120 controls and maintains information about the different blender apparatus (i.e., hoppers, feeders, etc). The computerized control system 120 also maintains information about automated blending operations, including maintaining information in the form of recipes and other blender apparatus and may be stored in data structures, as represented in FIGS. 2 and 3. Users interact with the computer system through the use of a touch screen display and/or a keyboard and monitor. New recipes and other system parameters are entered by this touch screen display and/or a keyboard into the computer system 120. In another aspect, the computer system is remotely accessible. Additionally, program control is done through the touch screen and/or keyboard. In a preferred embodiment, the computer system 120 is menu driven allowing control and display of the system in response to menu options. Furthermore, entry or modification of system variables in data structures in done in response to different window options.

FIG. 2 illustrates a blender apparatus data structure, which is a preferred embodiment of a data structure that retains information about the blender system. Stored in memory this data structure maintains information about the feeders and other system variables that are not recipe dependant. As shown in FIG. 2, the data structure contains the following information: the number of supply hoppers 202, the measurement units 206, and for each supply hopper the structure maintains: feeder type 208, cycle time 210 (the amount of time to open and close the feeder), enable retries 212, number of retries 214 (the number of retries allowed), calibration 216 (the material flow rate), and the initial target percentage 218 (this is the offset to compensate for the standard deviation of the feeder and is input by the user). The computer system 120 permits modification of the feeder and/or other system variables. For instance, adjusting the number of supply hoppers 202 and the predetermined gate cycle time 210 for each supply hopper is permitted. The gate cycle time 210 has been measured and set at the factory but might need to be adjusted if the mechanical design is changed. This setting will depend on the whether the feed system is a gate or auger. Furthermore, computer system 120 also maintains, and allows modification of, each feeder type 208 (slide gate, auger, etc), enabling a retry for each supply hopper 212, the number of permissible retries for each supply hopper 214, and the units of measurement used 206 (i.e., pounds or kilograms). The computer system 120 also permits a modification of each feeder's calibration 216. Other embodiments may vary the number and type of system information retained by the system.

Additionally, each feeder's accuracy may be tested to determine its standard deviation. By entering a target weight and identifying a feeder to test, the computer system 120 of the blender calculates a meter time based on the current feeder calibration and opens the gate for the appropriate amount of time. By repeatedly performing this test with the same target weight and recording the weight of the material dispensed, the standard deviation of the feeder system can be determined and later incorporated into the data retained by computer system 120 of the blender control system 10. In the preferred embodiment, a calculated standard deviation of the feeder is entered and reflected as the desired corresponding value as the percentage of the target weight 218. In this manner, the control system 120 will calculate an initial metering with this percentage of the target weight as the objective. Then during any retry, the control system 120 calculates subsequent metering as calculated based on the target weight minus the amount of material already metered. In another embodiment of the invention, the recordation of these test weights, and the calculation and the incorporation into the system parameters of the standard deviation is done automatically. In a preferred embodiment as commonly known, a feeder is initially set to default value and self calibrates during its first metering.

A recipe is the desired combination of different ingredient materials to make a batch. FIG. 3 illustrates a recipe data structure, which is a preferred embodiment of a data structure that retains information about a recipe and which is maintained in the computer system 120. The data structure contains the following information: the recipe mode 302, metering order 304, batch size 306, shutdown value 308, the batch ready mode 310, number of ingredients 312, and for each ingredient the recipe amount 314. Although a recipe is a combination of ingredients, a recipe is implemented by describing the recipe in terms of combining different hoppers (which contain the desired ingredients). The recipe mode 302, or the recipe's combination of ingredients, is expressed in a "Percentage Method," a "Parts Method," and/or an "EZ Method." In the Percentage method, commonly used in an extrusion process, a recipe is entered indicating the allocated percentage of each hopper to be used. The total percentages of each hopper should be one hundred percent. In the Parts Method, commonly used in compounding operations, ingredient values are based on "parts" of the whole. In the preferred embodiment, each part can have a value up to 999.99 and the total of all ingredients does not have to be 100. Individual target weights of each ingredient would be based upon the calculation of the ratio of each ingredient's "part" to the total batch size. In the "EZ" mode method, used most often for injection molding, one hopper is configured as virgin, one hopper is configured as a regrind, and others are configured as additives. The recipe for an injection molding process would have a value for the percentage of regrind, which represents a percentage of the total batch, and a percentage of additives, which represents a percentage of the virgin weight. Each percentage can be up to one hundred percent and the computer system 120 calculates the percentage of virgin material.

A recipe contains other system information as well. A recipe designates the specific order in which the ingredients are added (i.e., which hoppers are metered) by changing the metering order 304. The batch size 306 is established and can also be changed. In a preferred embodiment, the batch size 306 is initially factory set dependent upon the blender type. Other embodiments permit altering additional variables, including: changing the inventory shutdown value 308 (which allows the blender to make a certain amount of material at a time) and enabling or disabling batch ready mode 310 (enabling the batch ready mode permits the control system to prepare a batch and retain it in the weigh hopper until the mixer is finished with the batch it is currently mixing and ready to receive the new batch)

A recipe must be designated for use in the current blending operation. This recipe is either entered at the time by a user at the keyboard and/or touchscreen or a previously entered and stored in the computer system is utilized. If a recipe is entered and used for the current blending operation, it may be stored for later use. Furthermore, a recipe can be entered and stored without the need for utilizing it at the time of entry. Since the storage of a recipe in a computer system 120 requires storage space, the number of different recipes stored in the storage system is only limited by the storage capacity of the computer system 120. In an effort to limit storage use, systems may, for example, implement a limitation of fifty recipes. A collection of recipes is stored in a computer system 120 where the recipes can be deleted, adjusted, or edited, new recipes may be added, and old recipes may be recalled for use in the current blending operation. In a preferred embodiment, a new recipe may be entered by a user, or an previously created and stored recipe maybe loaded while the computer system 120 of the blender system 10 is controlling the metering and blending of an unrelated recipe.

The blender control system 10 makes a batch of a recipe by the computer system 120 controlling the metering of materials from the different hoppers based on the current recipe formula and current option settings. The computer system 120 determines the metering, or the feed time, by calculating the target weight of each hopper (ingredient), where the target weight is derived from the relationship between the desired batch weight and the correlated hopper. The calculation may also include an offset for an initial target weight percentage; where the initial target weight is intended to incorporate the standard deviation of the feeder. As described above, this calculation permits fewer overfills by intentionally under filling. As filling is an iterative process, the feed time calculation also incorporates feedback of the current state of the system thereby adjusting the amount of material remaining to be metered. For example, if in a recipe the ingredient in hopper one is ten percent (10%) of the batch weight and the batch weight is one hundred (100) pounds, then the target weight is ten pounds (10 lbs). When the calculation is first made if an initial percentage has been entered of eighty percent (80%) (to intentionally undershoot) then the calculation determines the feed time based on eighty percent (80%) of ten pounds (10 lbs). If the feeder is calibrated to one pound per second (1 lb./sec) then, the feed time will be eight (8) seconds. The control system will then meter the appropriate feeder for eight (8) seconds. Feed time for remaining meters of this hopper (in this sequence) incorporates the amount of material already fed. If the weigh hopper is measured and weighs seven and one half pounds (7½ lbs.) then the remaining amount of material to be fed is two and one half pounds (2½ lbs.), which would correspond to two and one half seconds (2½ sec.). Initial target percentage is only incorporated on the first metering of the ingredient per batch.

Figure 4:
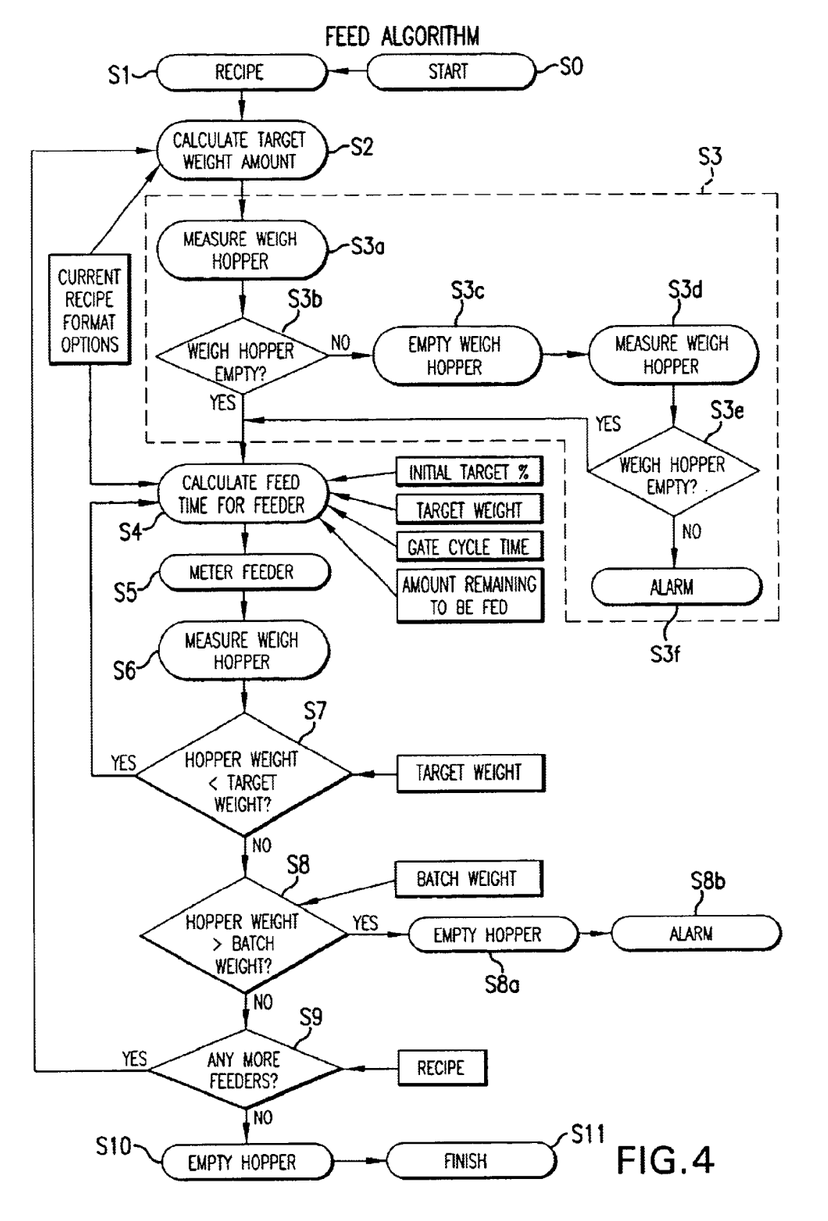
FIG. 4 is a flow chart of the steps taken by a blender control system of FIGS. 1 and 6 in making a batch from a recipe.

In a preferred embodiment, the execution of automated control system to make a batch would proceed in the following steps (as show in FIG. 4):

In Step S0, the program execution awaits a command. If the command is given to mix a batch then the program execution begins the steps necessary to mix a new batch and continues to the next step.

In Step S1, a recipe is chosen. As indicated above, either a new recipe may be entered at that time or a previously entered and stored recipe may be loaded from the computer system 120 storage. As indicated above, if a recipe is entered at that time then the recipe mode and the composition of the different ingredients is entered. Once a recipe is chosen and loaded or entered, any adjustments made to the recipe, any recipe options have been entered, and the batch size has been entered, the program proceeds.

In Step S2, the target weight of the current ingredient is calculated. The computer system 120 derives the target weight from the desired batch size and the ratio of the ingredient to the target weight. For example, if the batch size is one hundred (100) kgs. and the current ingredient's amount, in percentage mode, is twenty percent (20%), then the target weight is twenty (20) kgs.

In Step S3, the weigh hopper is cleared. In a preferred embodiment, the program follows this short algorithm:

In Step S3a, the weigh hopper is weighed.

In Step S3b, if the weight of the weigh hopper is equivalent to, or greater than, a pre-stored empty weight value, then execution proceeds to Step S4. Otherwise execution proceeds to Step S3c.

In Step S3c, the weigh hopper is emptied by conventional methods.

In Step S3d, the weigh hopper is weighed.

In Step S3e, if the weight of the weigh hopper is equivalent to, or greater than, a pre-stored empty weight value, then execution proceeds to Step S4. Otherwise execution proceeds to Step S3f.

In Step S3f, an alarm is given. In an alternative embodiment, the program continues to attempt to lower the weight of the weigh hopper by repeatedly dumping the weigh hopper until either the weight is lower or an operator interrupts the program.

Figure 7:
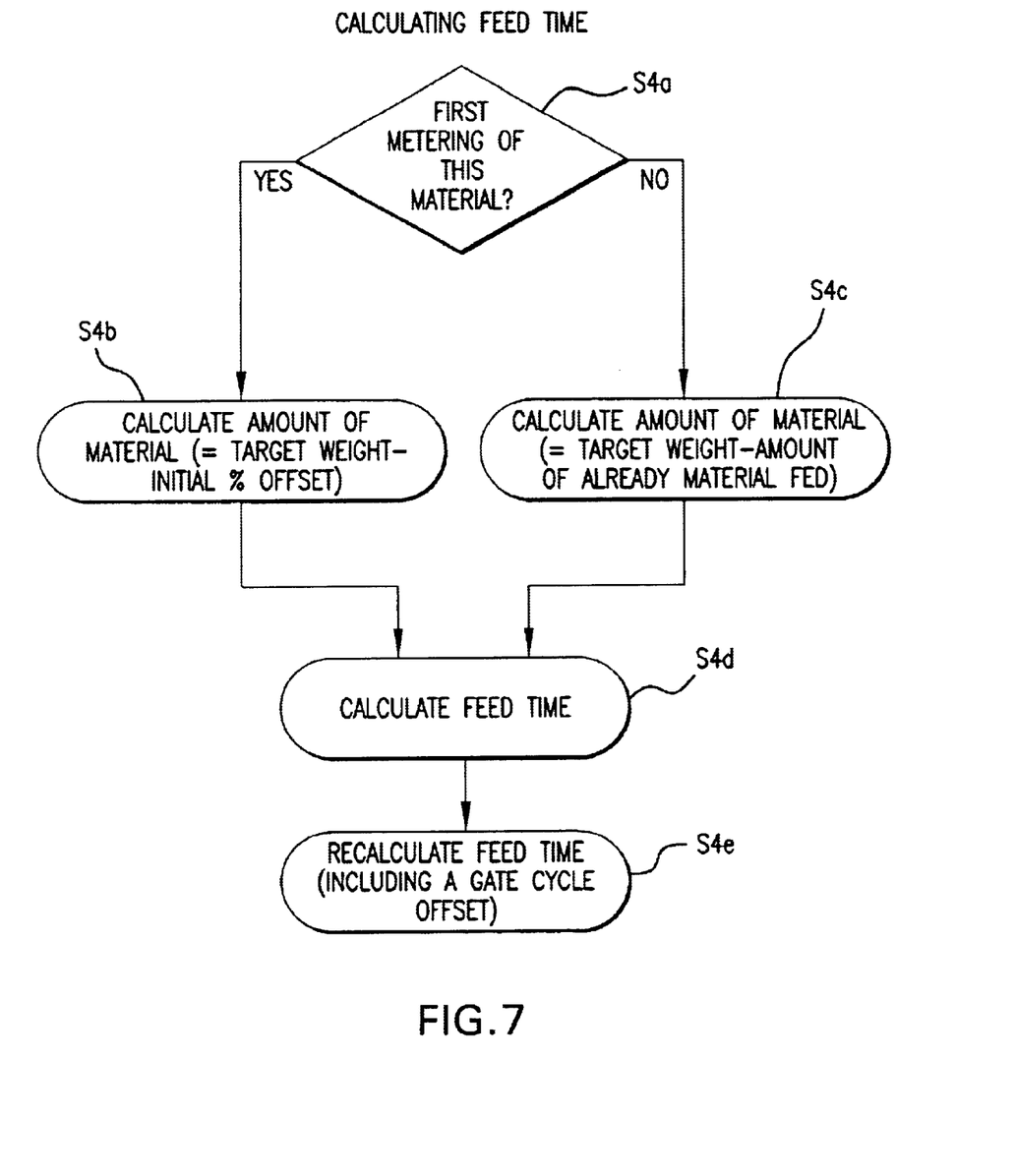
FIG. 7 is a flow chart of the steps taken by a blender control system of FIGS. 1 and 6 when calculating the feed time.

In Step S4, the feed time is calculated. Taking into consideration the target weight, the initial percentage of target weight (only used on first iteration), the amount remaining to be fed (only used after first iteration), the feeder calibration of that hopper, and the gate cycle time (FIG. 5), the feed time is computed in the following steps (as shown in FIG. 7):

In Step S4a, the computer system 120 determines if this is the first time in this batch metering this ingredient. If it is the first time then it proceeds to Step S4b. If it is not the first time in this batch metering this ingredient then it proceeds to Step S4c.

In Step S4b, the computer system 120 calculates the amount of material to be fed equal to the target weight minus any offset for 'initial percentage of target weight.' Execution continues to Step S4d.

In Step S4c, the computer system 120 calculates the amount of material to be fed equal to the target weight minus amount of material already fed. Execution continues to Step S4d.

In Step S4d, the computer system 120 calculates the feed time relating the amount of material to be fed with the calibration of this feeder.

In a preferred embodiment, the computer system 120 will incorporate offsets for gate cycle time. If in the gate cycle doubling embodiment, then execution proceeds to Step S60 (described below).

In Step S4e, the computer system 120 recalculates the feed time including a gate cycle time offset.

In Step S5, the feeder is metered for the feed time calculated in the previous step.

In Step S6, the weigh hopper's weight is measured to determine the amount of material that was actually fed.

In Step S7, the weigh hopper's weight is compared to the target weight. If it is less than the target weight then the program execution returns to Step S4. Otherwise the program execution proceeds to the next step.

In Step S8, the weigh hopper's weight is compared to the batch weight. If it is greater than the batch weight then execution proceeds to Step 8a where the program dumps the current batch and Step 8b alarms appropriately. Otherwise, program execution continues to the next step.

In Step S9, the recipe is checked to see if all of the ingredients have been metered. If there any more material (feeders) to be metered then program execution returns to Step S2. Otherwise the program execution proceeds to Step S10.

In Step S10, the material in the weigh hopper is emptied into the mixing chamber.

In Step S11, the program execution is completed for this recipe batch. In a preferred embodiment the program will return to S0 to feed and blend additional recipes or additional batches of this recipe.

Figure 5:
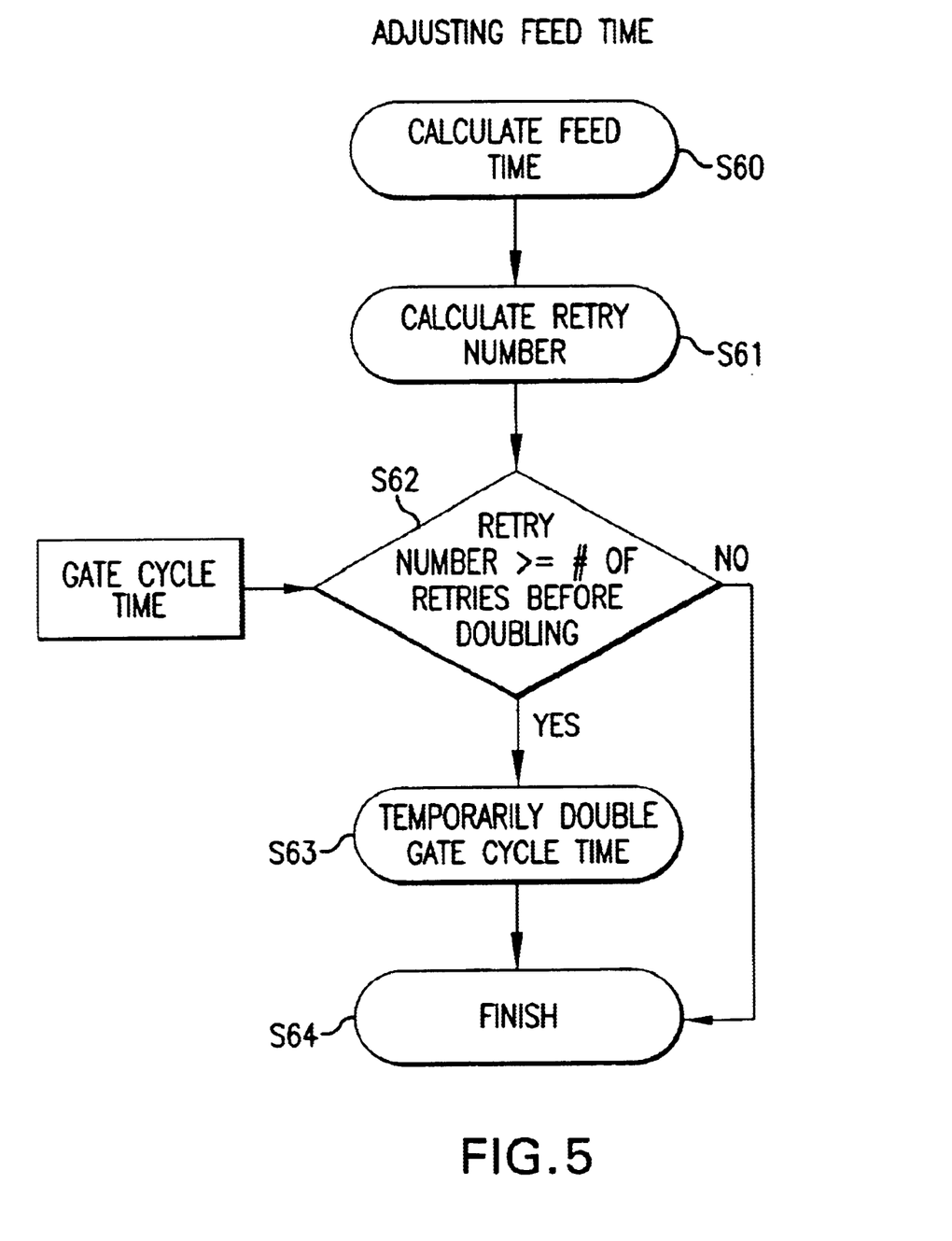
FIG. 5 is a flow chart of the steps taken by a blender control system of FIGS. 1 and 6 when calculating the feed time and adjusting for a gate cycle time by temporarily doubling the cycling time.

Depending on the setting, the calculation of feed time might also incorporate offsets required to compensate for a gate cycle time. If a gate cycle time (the time to open and close a gate) is larger than a feed time then the gate will not open and no material will be fed. In this method, the number of remeters is calculated (in that batch for that ingredient), and after an established number of retries, the gate cycle time is temporarily doubled prior to offsetting the feed time. The method of doubling the feed time is shown in FIG. 5 and incorporates the following steps (FIG. 5):

In Step S60, the program has calculated the feed time in Step S4 and the program execution continues to Step S61.

In Step S61 the computer calculates how many times in this batch this feeder has attempted to retry feeding.

In Step S62 if the number of retries is equal to, or greater than, the value stored for the 'number of retries before doubling', then the execution continues to Step S63. Otherwise execution proceeds to S64.

In Step S63, the gate cycle time is recalculated and temporarily doubled for this metering.

In Step S64 program execution returns to the main algorithm (FIG. 4) and proceeds to Step S4e.

In other embodiments, the feed time is calculated, in Step S63, equivalent to a predetermined amount of time in addition to the cycle time.

Although the preferred embodiment refers to an automated control of a system, it is also preferable to provide the option of being able to control the system manually. Furthermore, separate processes may be combined into a single process therefore reducing the number distinct processes and visa versa; process that are represented here as a single step, may be broken down into a plurality of steps. Additionally, although information storage is represented in the representative data structures shown in FIGS. 2 and 3, information storage is not limited to this format.

The above description and drawings are only illustrative of preferred embodiments of the present invention, and are not intended to limit the present inventions thereto. Any subject or modification thereof which comes within the spirit and scope of the following claims is to be considered part of the present invention.

What is claimed as new and desired to be protected by Letters Patent of the United States is:

1. A method for controlling the cyclical feeding of material through a feeder comprising the steps of:
   (a) calculating a target feed amount for a flowable, bulk solid ingredient material;
   (b) emptying a hopper;
   (c) calculating an adjusted feed amount substantially equivalent to a percentage of said target feed amount;
   (d) calculating a feed time to feed said adjusted feed amount of said material through a feeder to said hopper;
   (e) recalculating said feed time to include a feeder cycle offset;
   (f) feeding said feeder for said feed time;
   (g) generating a weight signal indicative of the amount of said material in said hopper;
   (h) calculating said adjusted feed amount substantially equivalent to said target feed amount offset by said weight signal;
   (i) calculating said feed time substantially equivalent to feed said adjusted feed amount of said material through said feeder to said hopper;
   (j) recalculating said feed time to include said feeder cycle offset; and
   (k) feeding said feeder for said feed time.

2. The method of claim 1, further comprising the step of:
   (l) repeating steps (g)-(k) until said weight signal is substantially equivalent to said target feed amount.

3. The method of claim 1, further comprising the steps of:
   calculating accuracy of said feeder; and
   calculating before step (c) said percentage based on said accuracy of said feeder.

4. The method of claim 3 further comprising the steps of after step (i) and before step (j):
   storing a retry value substantially equivalent to the number of times that step (i) is executed for said material; and
   calculating said feed time offset to correspond to a preset gate cycle increase if said retry value is substantially equivalent to a retry number and calculating said feed time offset to correspond to a zero if said retry value is not substantially equivalent to said retry number.

5. The method of claim 4 further comprising the step of:
   repeating steps (a) through (l) until substantially all said materials of a recipe are fed.

6. A method of controlling a feeder, comprising the steps of:
   (a) calculating a target feed amount for a flowable, bulk solid ingredient material;
   (b) calculating an adjusted feed amount substantially equivalent to a percentage of said target feed amount, where said percentage corresponds to the accuracy of a feeder;
   (c) calculating a feed time to feed said adjusted feed amount of said material through said feeder to a hopper; and
   (d) recalculating said feed time to include a feeder cycle offset.

7. The method of controlling a feeder in claim 6, further comprising:
   calculating said feeder cycle offset to correspond to a preset gate cycle factor if a gate cycle time of said feeder is longer than said feed time and calculating said feeder cycle offset to correspond to a zero if said gate cycle time of said feeder is not longer than said feed time.

* * * * *